United States Patent
Spertus

(10) Patent No.: US 8,392,992 B1
(45) Date of Patent: Mar. 5, 2013

(54) METHOD AND APPARATUS FOR PREVENTING SENSITIVE DATA LEAKAGE DUE TO INPUT FOCUS MISAPPROPRIATION

(75) Inventor: Michael Spertus, Wilmette, IL (US)

(73) Assignee: Symantec Corporation, Mountain View, CA (US)

( * ) Notice: Subject to any disclaimer, the term of this patent is extended or adjusted under 35 U.S.C. 154(b) by 1071 days.

(21) Appl. No.: 12/130,016

(22) Filed: May 30, 2008

(51) Int. Cl.
*G06F 21/00* (2006.01)

(52) U.S. Cl. .......................................... 726/23

(58) Field of Classification Search ................ 726/23
See application file for complete search history.

(56) References Cited

U.S. PATENT DOCUMENTS

| | | | | |
|---|---|---|---|---|
| 7,627,518 | B1* | 12/2009 | West ............................ | 705/37 |
| 2005/0198589 | A1* | 9/2005 | Heikes et al. ................ | 715/805 |
| 2006/0005039 | A1* | 1/2006 | Hsieh ........................... | 713/183 |
| 2009/0094551 | A1* | 4/2009 | Alkov et al. ................. | 715/802 |

OTHER PUBLICATIONS

"About the security content of J2SE 5.0 Release 4," downloaded from web site http://docs.info.apple.com/article.html?artnum=303658 on Jul. 15, 2008, Copyright © 2008 Apple Inc.
"Security Vulnerabilities in the Java Runtime Environment may Allow an Untrusted Applet to Elevate its Privileges," downloaded from web site http://sunsolve.sun.com/search/document.do?assetkey=1-26-102171-1 on Jul. 15, 2008, Copyright © 2008 Sun Microsystems, Inc., SunSolve Version 7.0.5 (prod build #2).
"Security Vulnerability With Java Web Start," downloaded from web site http://sunsolve.sun.com/search/document.do?assetkey=1-26-102170-1 on Jul. 15, 2008, Copyright © 2008 Sun Microsystems, Inc., SunSolve Version 7.0.5 (prod build #2).

\* cited by examiner

*Primary Examiner* — Jason Gee
(74) *Attorney, Agent, or Firm* — Wilmer Cutler Pickering Hale and Dorr LLP

(57) ABSTRACT

A method and apparatus for preventing sensitive data leakage due to input focus misappropriation is described. In one embodiment, a method for restricting a change in an input focus to protect sensitive data comprising identifying a visual representation component used to receive sensitive data, wherein the virtual representation component having an input focus of a computer and preventing a change in the input focus from the visual representation component.

20 Claims, 3 Drawing Sheets

METHOD AND APPARATUS FOR PREVENTING SENSITIVE DATA LEAKAGE DUE TO INPUT FOCUS MISAPPROPRIATION

BACKGROUND OF THE INVENTION

1. Field of the Invention

Embodiments of the present invention generally relate to data leakage prevention. In particular, embodiments of the invention relate to a method and apparatus for detecting an attempt to misappropriate an input focus from an application to prevent sensitive data leakage.

2. Description of the Related Art

Focus misappropriation (also known as "focus stealing") is a common behavior performed by various software applications (e.g., AOL Instant Messenger) on a graphical user interface (e.g., a presentation window). "Focus input" indicates the component of the graphical user interface which is currently selected to receive input. Basically, focus misappropriation occurs when an input focus is taken or changed from a first application to a second application without the user requesting such a change. The second application may take change the input focus from the first application for a malicious and/or a benign purpose. For example, the first application may be a malicious software program that is configured to misappropriate sensitive data. As another example, the first application may be a browser application that changes the input focus whenever an advertisement is presented on a computer display. Regardless, focus misappropriation disrupts the productivity of a user by changing the presentation window currently receiving the input focus and, thus, altering the direction of user input.

Often, when presented with an incorrect presentation window, a user accidently inputs data into the incorrect presentation window. Sometimes, the data entered in the incorrect presentation window comprises sensitive information such as passwords, social security numbers, bank accounts and the like. The input of sensitive data (e.g., passwords) into the incorrect presentation window presents a security risk for the user. For example, an Instant Message application changes the input focus when a new message arrives while the user is in the middle of accessing a bank account online. Consequently, the user accidently types in a password for the bank account on the instant message window instead of an online form for accessing the back account. If the user does not catch such a mistake before the password is communicated, the bank account is at risk for theft.

Generally, controls (i.e., MICROSOFT WINDOWS controls) are visual representation components (i.e., software code) that are defined in a user interface implementation and generated (e.g., instantiated) by the operating system for interacting with the user. Such controls comprise information regarding a format and a layout of a graphical object presented on the computer display. For example, a control may define a visual style for an edit box that receives a password as input from the user. Currently, solutions for input focus stealing, such as MICROSOFT TWEAK UI (e.g., an application for adjusting the user interface without manually altering the registry), do not distinguish between controls used for receiving passwords (i.e., security risks) and the general behavior of presentation windows on a computer display. In other words, such solutions do not treat input focus stealing from the control used for receiving passwords as a security risk, but rather as a normal behavior that does not pose a threat to the user.

Therefore, there is a need in the art for a method and apparatus for restricting or preventing an input focus change on a computer display where a visual representation component that is currently in focus is used to receive sensitive data.

SUMMARY OF THE INVENTION

Embodiments of the present invention generally provide a method and apparatus for preventing sensitive data leakage due to input focus misappropriation. In one embodiment, the method comprising identifying a visual representation component used to receive sensitive data, wherein the virtual representation component having an input focus of a computer and preventing a change in the input focus from the visual representation component.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
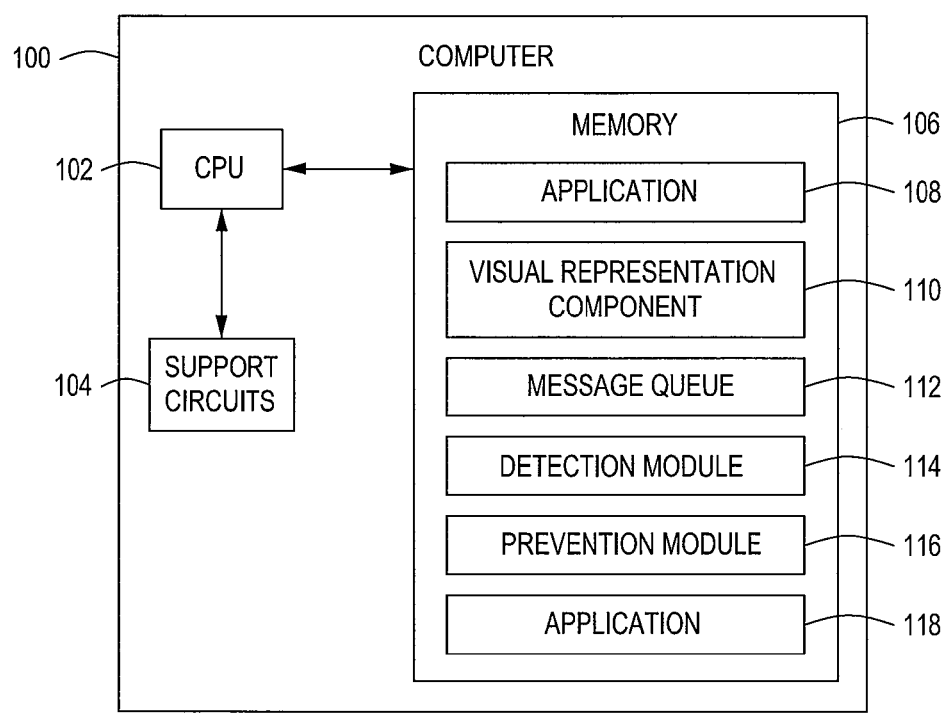
FIG. 1 is a block diagram of a computer for preventing a change in an input focus according to one embodiment.

To facilitate understanding, identical reference numerals have been used, where possible, to designate identical elements that are common to the figures. It is to be noted, however, that the appended drawings illustrate only typical embodiments of this invention and are therefore not to be considered limiting of its scope, for the invention may admit to other equally effective embodiments.

DETAILED DESCRIPTION

FIG. 1 is a block diagram of a computer 100 for restricting focus misappropriation (commonly known as "focus stealing") according to one embodiment of the present invention. Various software applications that run on a computer 100 may interact with users through a user interface. Such a user interface comprises one or more presentation windows that facilitate the interaction between an application 108 and the user. The one or more presentation windows use a visual representation component to receive data input and/or present data to the user. The visual representation component must have an input focus (i.e., currently be "in focus") to receive the data input. Hence, the input focus enables the interaction between the application 108 and the user.

The computer 100 is a computing device (e.g., a laptop, a desktop, a Personal Desk Assistance (PDA), a tablet, a mobile phone and the like) that comprises a central processing unit (CPU) 102, various support circuits 104 and a memory 106. The CPU 102 may comprise one or more commercially available microprocessors or microcontrollers that facilitate data processing and storage. Various support circuits 104 facilitate operation of the CPU 102 and may include clock circuits, buses, power supplies, input/output circuits and/or the like. The memory 106 includes a read only memory, random access memory, disk drive storage, optical storage, removable storage, and the like. The memory 106 further includes various data, such as a message queue 112. The memory 106 further includes various software packages, such as an application 108, a visual representation component 110, a detection module 114, a prevention module 116 and an application 118.

The application 108 comprises software code (e.g., one or more computer instructions) including, for example, a legitimate (i.e., safe) software application, such as a word processing application, a messaging application, an email application, a browser application and/or the like. Similarly, the application 118 comprises software code and may be any type of software application. For example, the application 118 may be a legitimate software application, as mentioned above, or a malicious software application (e.g., malware). In one embodiment, the application 118 may comprise malicious software code that acquires sensitive data (e.g., passwords) associated with a user of the computer 100.

Generally, the visual representation component 110 comprises software code for defining one or more portions of a presentation window on a computer display. The one or more portions of the presentation window may be employed by a software application (e.g., the application 108) to interact with a user of a computer, such as the user of the computer 100. Hence, the visual representation component 110 may be a discrete user interface (UI) element (e.g., a computer object) that is associated with the functionality of the software application (e.g., process data (e.g., data input), events (e.g., exceptions), actions and/or the like from the user). In one embodiment, the visual representation component 110 may be defined in an implementation of a graphical user interface (GUI) that is used at the computer 100. Accordingly, the software application may access and/or execute the visual representation component 110 through the implementation of the GUI to create an instance of the visual representation component 110 on the presentation window.

In one embodiment, the visual representation component 110 may be configured to control and/or generate the presentation window in order to enable the interaction between the user of the computer 100 and the software application 108. Moreover, the application 108 may use the visual representation component 110 to process data provided by the user through the presentation window (e.g., receive the data as input from the user) and/or present data to the user through the presentation window in order to facilitate the operation of the application 108.

For example, the visual representation component 110 may be a portion (e.g., a MICROSOFT WINDOWS control) of the MICROSOFT WINDOWS FORMS programming model for creating GUI-based applications (i.e., creating a user interface for the application 108). Typically, a top-level presentation window for an application (e.g., a main presentation window for the application 108) is a form as defined by the MICROSOFT WINDOWS FORMS programming model (i.e., an instance of a class derived from "SYSTEM.WIN-FORMS.FORM"). The top-level presentation window may comprise a MICROSOFT WINDOWS control, such as a Button, a TextBox, a ListView, a MonthCalender, a DialogBox, an EditBox control, a Menu and the like. In one embodiment, the application 108 may add, align, position and/or remove the MICROSOFT WINDOWS control within the top-level presentation window.

Whenever the user of the computer 100 interacts with the MICROSOFT WINDOWS control (e.g., strikes a key, clicks a mouse and the like), an event is generated. An event handler (e.g., software code) may be executed by the MICROSOFT WINDOWS control to handle or respond to the event caused by the key stroke or the mouse click. For example, the mouse click may be received by a Button control on the presentation window created by the application 108 of which the Button control is configured to cancel the execution. As a result, the mouse click causes the termination of the top-level presentation window.

According to one or more embodiments of the present invention, the top-level presentation window may have an input focus of the computer 100. Generally, the input focus is a visual feedback to indicate which portion of the MICROSOFT WINDOWS control is interacting with the user of the computer 100. For example, a border color change occurs or a dotted, rectangular line appears on a Button Control. As another example, a caret appears (i.e., a cursor) at an insert position on an EditBox control. As yet another example, a visual appearance of an item or area on the presentation window occurs when the user of the computer 100 moves (i.e., hovers) a mouse over the item or area. A property within the MICROSOFT WINDOWS control may be set to have the input focus.

In order for the visual representation component 110 (e.g., an EditBox control on the main presentation window) to actually receive data input, an operating system of the computer 100 must provide the main presentation window with the input focus. The input focus may be changed to another application (e.g., the application 118). In one embodiment, software code (e.g., a FOCUS method in "SYSTEM.WIN-DOWS.FORMS") that is configured to set the input focus to the application 118 may be employed. For example, a request for the input focus may be successful in changing the input focus to the application 108. In another embodiment, a message (e.g., a MICROSOFT WINDOWS MESSAGE) that is configured to stop and/or change a current input focus may be generated. Such a message may be located in a message queue 112 (e.g., a MICROSOFT WINDOWS MESSAGE QUEUE). Generally, the message is a unit of information transmitted from one process running on a computer to another process (e.g., running on another computer). The message may be received by the main presentation window associated with the application 108 on the computer 100. For example, the message queue 112 may comprise a WM_COMMAND message with an EN_KILLFOCUS notification. Such a WM_COMMAND message may indicate that the visual representation component 110 (e.g., an EditBox control on the main presentation window) lost the input focus (e.g., a keyboard focus). According to various embodiments, the visual representation component 110 handles or responds to such a WM_COMMAND message to prevent the input focus change as described further below.

As mentioned above, the visual representation component 110 may be an EditBox control on the main presentation window for receiving data (e.g., sensitive data, such as a password) as input from the user of the computer 100. One or more style constants may be specified to define the EditBox control. For example, EditBox control style constant ES_PASSWORD may be used to display an asterisk for each character typed into the EditBox control in order to hide the actual password. Accordingly, the ES_PASSWORD style constant indicates that the EditBox control is used to receive sensitive data, such as a password.

The application 118 may be a legitimate software application or a threat to the computer, such as malware or a virus. In one embodiment, the application 118 may desire to steal or obtain the input focus to interact with the user. In another embodiment, the application 118 may be configured to change the input focus to obtain a password of the user and render the computer 100 vulnerable to attack and exploitation. The application 118 may request the input focus or may invalidate the main presentation window to force a change in the input focus to another visual representation component on another presentation window. If the input focus is changed to the another visual representation component, the password inputted by the user is directed to the second presentation window associated with the application 118 instead of the visual representation component 110.

The detection module 114 and the prevention module 116 cooperate to protect the user of the computer 100 from accidently leaking the password or any other sensitive data via the change in the input focus as described above. In operation, the detection module 114 determines if the visual representation component 110 has the input focus (i.e., the MICROSOFT WINDOWS control is currently in focus) and is used to receive the password or another other sensitive data from the user as input. In one embodiment, the detection module 114 identifies the visual representation component 110 by examining a property (e.g., a FOCUS property and/or or a VISIBLE property of the MICROSOFT WINDOWS control) to determine if the visual representation component 110 has the input focus. For example, the detection module 114 may poll a plurality of visual representation components on the computer 100 to identify the visual representation component with the input focus. In another embodiment, the detection module 114 examines a format or an appearance of the visual representation component 110.

In one embodiment, the detection module 114 examines constants (e.g., style constants) and/or properties that are specified for the visual representation component 110. For example, if the visual representation component 110 comprises an ES_PASSWORD style constant, then the visual representation component 110 is most likely a MICROSOFT WINDOWS control for receiving passwords (e.g., an EditBox control). Accordingly, the visual representation component 110 is identified as a security risk for the user of the computer 100 because of the likelihood of password leakage from the input focus change.

Consequently, the prevention module 116 restricts or blocks a change to the input focus (i.e., focus stealing) to protect the visual representation component 110 from the effects of password leakage. Hence, any attempt by the application 118 to invalidate the main presentation window and/or change the input focus is prevented and/or disabled. In one embodiment, the visual representation component 110 (e.g., MICROSOFT WINDOWS control, such as an Edit control) uses (e.g., invokes) the prevention module 116 to handle or respond to the attempts to change the input focus (e.g., events, messages and the like). For example, the prevention module 116 is a hook for a MICROSOFT WINDOWS message that may cause the input focus to change, such as the WM_COMMAND message that comprises the EN_KILLFOCUS notification as mentioned above. The prevention module 116 may block or restrict the WM_COMMAND message. As a result, the EditBox (i.e., password) control on the main presentation window retains the input focus.

Furthermore, the prevention module 116 may be configured to perform one or more operations once an attempt to change the input focus is recognized. The prevention module 116 may create a presentation window and generate a visual representation component that interacts with the user of the computer 100. For example, a message box may appear on the computer display of the computer 100 and provide the user with information regarding the attempt to change the input focus. The message box may also ask the user to approve the change in the input focus. If the user approves, the prevention module 116 permits the change in the input focus. For example, the prevention module 116 permits the WM_COMMAND message with the EN_KILLFOCUS notification to change the input focus from the application 108 to the application 118.

Figure 2:
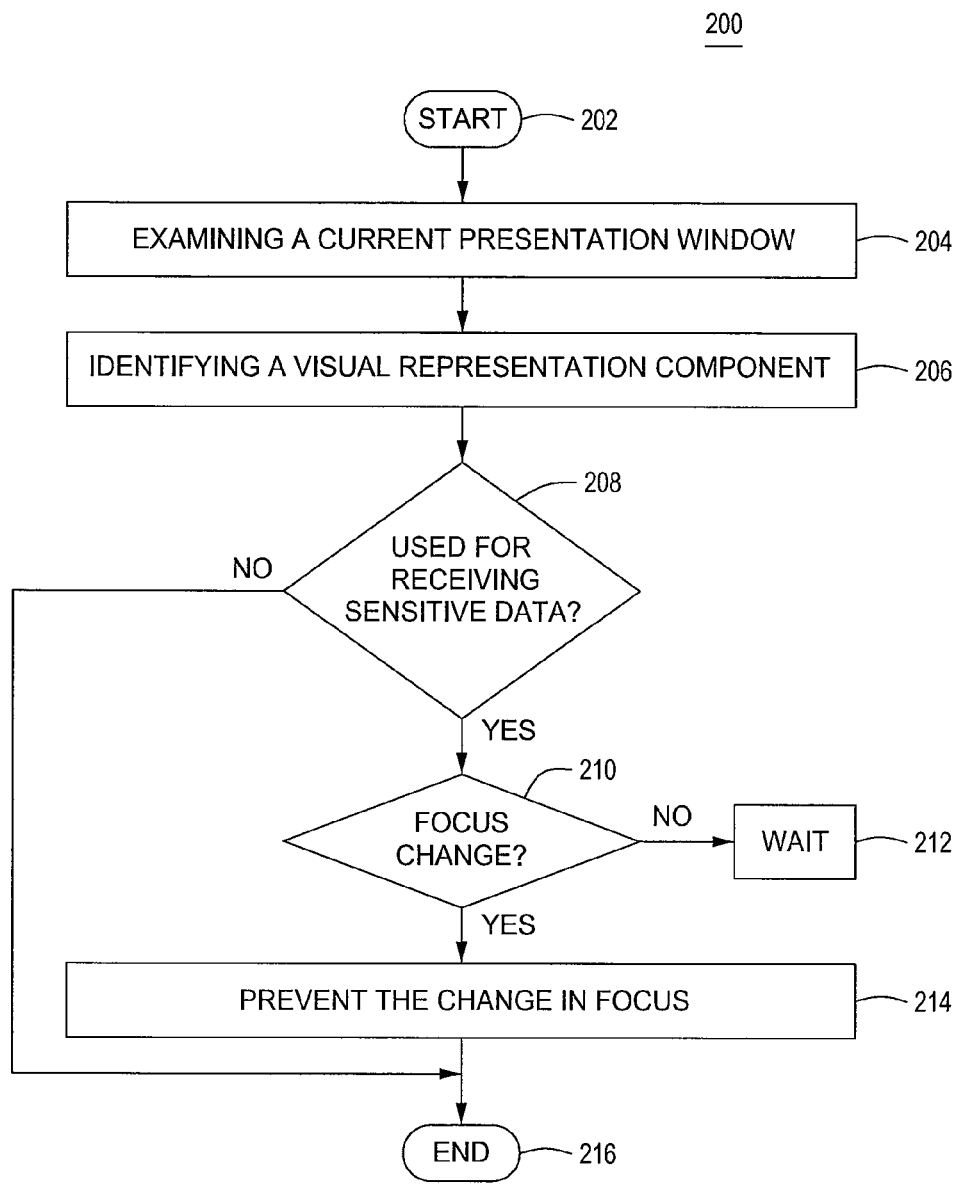
FIG. 2 is a flow diagram of a method for preventing a change in an input focus according to one embodiment.

FIG. 2 is a flow diagram of a method 200 for preventing a change in an input focus according to one embodiment. The method 200 begins at step 202 and proceeds to step 204.

At step 204, a current presentation window (e.g., the main presentation window associated with the application 108 of FIG. 1) is examined. At step 206, a visual representation component is identified. At step 208, a determination is made as to whether the visual representation component is used for receiving sensitive data (e.g., inputting passwords). If the visual representation component is not used for receiving sensitive data, the method 200 proceeds to step 216. If the visual representation component is used for receiving sensitive data, the method 200 proceeds to step 210. At step 210, a determination is made as to whether there is a change in the input focus. If there is no change in the input focus, the method 200 proceeds to step 212 where the method 200 waits. In one embodiment, the method 200 waits until the current presentation window is closed by a user. If there is a change in the input focus, the method 200 proceeds to step 214. At step 214, the change in focus is prevented. At step 216, the method 200 ends.

Figure 3:
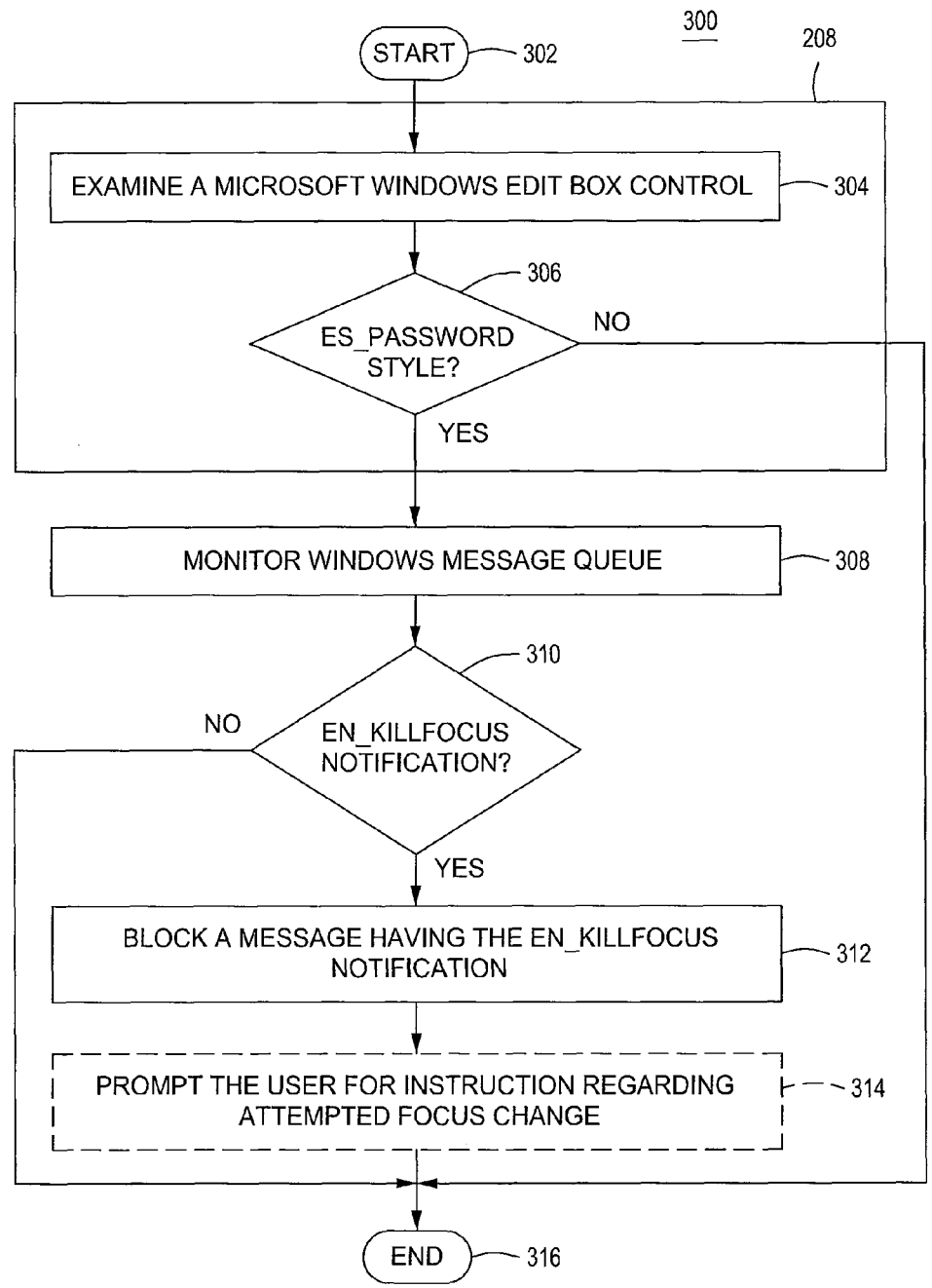
FIG. 3 is a flow diagram of a method for securing a control from data leakage according to one embodiment.

FIG. 3 is a flow diagram of a method 300 for securing a computer from password leakage due to a change in the input focus according to one embodiment. The method 300 begins at step 302 and proceeds to step 304.

At step 304, a MICROSOFT WINDOWS EditBox control is examined. At step 306, a determination is made as to whether an ES_PASSWORD style constant is specified for the MICROSOFT WINDOWS EditBox control. If the ES_PASSWORD style constant is specified, the method 300 proceeds to step 308. Hence, the MICROSOFT WINDOWS EditBox control is configured to receive sensitive data and a security risk. If the ES_PASSWORD style constant is not specified, the method 300 proceeds to step 316. The steps 304 to 306 represent an embodiment of the step 208 of the method 200 as described above for FIG. 2.

At step 308, a WINDOWS message queue is monitored. As mentioned above, various WINDOWS messages may be used to force a change in the input focus. At step 310, a determination is made as to whether a WINDOWS message (e.g., a WM_COMMAND message) has an EN_KILLFOCUS notification. If the WINDOWS message has the EN_KILLFOCUS notification, the method 300 proceeds to step 312. If the WINDOWS message does not have the EN_KILLFOCUS notification, the method 300 proceeds to step 316. At step 312, the WINDOWS message is blocked. As a result, any attempt to change the input focus is disabled. Optionally, at step 314, the user is prompted for instruction regarding the attempted input focus change. For example, a message box is presented that prompts the user for approval for the attempted input focus change.

While the foregoing is directed to embodiments of the present invention, other and further embodiments of the invention may be devised without departing from the basic scope thereof, and the scope thereof is determined by the claims that follow.

The invention claimed is:

1. A method for restricting a change in an input focus to protect sensitive data, comprising:
identifying a visual representation component used to receive sensitive data, wherein the visual representation component has an input focus of a computer, wherein identifying the visual representation component comprises determining whether the visual representation component is used for receiving sensitive data, wherein determining whether the visual representation component is used for receiving sensitive data comprises determining whether a visual style of the visual representation component is associated with a password, wherein determining whether a visual style of the visual representation component is associated with a password comprises examining a style constant for the visual representation component; and preventing a change in the input focus from the visual representation component.

2. The method of claim 1, wherein the visual representation component is
associated with access to a resource.

3. The method of claim 1, wherein preventing the change further comprising:
examining a plurality of computer window messages; and
determining a first computer window message that is configured to cause the change in the input focus.

4. The method of claim 3, wherein the first computer window message is configured to invalidate a current computer window, wherein the current computer window comprises the visual representation component.

5. The method of claim 3, wherein preventing the change further comprises disabling the first computer window message.

6. The method of claim 3, wherein preventing the change further comprises invoking a hook associated with the visual representation component to block the change in the input focus in response to the first computer window message.

7. The method of claim 1, wherein preventing the change further comprises monitoring a computer window message queue to detect the change in the input focus.

8. The method of claim 1, wherein preventing the change further comprises disabling an ability of an application to change the input focus.

9. The method of claim 1 further comprising permitting the change the input focus based on computer user approval.

10. The method of claim 1, wherein identifying the visual representation component further comprises examining a property of the visual representation component, wherein the property indicates that the visual representation component has the input focus.

11. The method of claim 1, wherein determining whether the visual representation component is used for receiving sensitive data further comprises determining whether the visual representation component is used for receiving a social security number or a bank account number.

12. An apparatus for restricting a change in an input focus to protect sensitive data, comprising:
a detection module for recognizing a visual representation component associated with receiving sensitive data, wherein the visual representation component has an input focus of a computer, wherein recognizing the visual representation component comprises determining whether the visual representation component is used for receiving sensitive data, wherein determining whether the visual representation component is used for receiving sensitive data comprises determining whether a visual style of the visual representation component is associated with a password, wherein determining whether a visual style of the visual representation component is associated with a password comprises examining a style constant for the visual representation component; and;
a prevention module for blocking a change in the input focus away from visual representation component.

13. The apparatus of claim 12, wherein the detection module determines the visual representation component is used for receiving a password.

14. The apparatus of claim 12, wherein the prevention module examines a windows message queue to identify a message related to the change in the input focus.

15. The apparatus of claim 12, wherein the detection module recognizes a visual style of the visual representation component that is associated with a password and identifies the visual representation component as a security risk.

16. The apparatus of claim 12, wherein the prevention module generates a computer window for prompting a user for permission to permit the change the input focus.

17. An apparatus for restricting a change in an input focus to protect sensitive data, comprising:
a first application for processing sensitive data using a visual representation component, wherein the visual representation component has an input focus of a computer;
a second application for communicating a message that is configured to change the input focus;
a detection module for examining the visual representation component to determine that the visual representation component is associated with processing the sensitive data, wherein determining that the visual representation component is associated with processing the sensitive data comprises determining whether a visual style of the visual representation component is associated with a password, wherein determining whether a visual style of the visual representation component is associated with a password comprises examining a style constant for the visual representation component; and
a prevention module for handling the message communicated by the second application to block the change in the input focus away from visual representation component.

18. The apparatus of claim 17, wherein the visual representation component invokes the prevention module in response to the message communicated by the second application.

19. The apparatus of claim 17, wherein the prevention module generates a computer window for prompting a user for approval of the change in the input focus.

20. The apparatus of claim 17, wherein the prevention module permits the message communicated by the second application to change the input focus based on an approval by the user.

* * * * *